United States Patent

[11] 3,603,549

| [72] | Inventors | Frank P. Brilando<br>Niles;<br>Stanley R. Jameson, Chicago, both of, Ill. |
|---|---|---|
| [21] | Appl. No. | 782,589 |
| [22] | Filed | Dec. 10, 1968 |
| [45] | Patented | Sept. 7, 1971 |
| [73] | Assignee | Schwinn Bicycle Company<br>Chicago, Ill. |

[54] UNIVERSAL SUPPORT FOR FRONT BASKET FOR BICYCLES
3 Claims, 3 Drawing Figs.

| [52] | U.S. Cl. | 248/230, 211/71, 224/35, 248/313 |
|---|---|---|
| [51] | Int. Cl. | B62j 9/00 |
| [50] | Field of Search | 248/230, 231, 226.4, 311, 313, 154; 211/71, 88, 112; 224/35, 36 |

[56] References Cited
UNITED STATES PATENTS

| 2,143,065 | 1/1939 | Glenny | 248/230 X |
| 2,589,497 | 3/1952 | Jette | 224/35 |
| 2,606,732 | 8/1952 | Luomala | 248/154 |
| 2,814,455 | 11/1957 | Rainey | 248/226 UX |
| 3,011,746 | 12/1961 | Zangger | 248/316 X |
| 3,311,277 | 3/1967 | Gordon | 224/35 |

FOREIGN PATENTS

| 873,446 | 7/1942 | France | 248/230 |

Primary Examiner—Edward C. Allen
Assistant Examiner—J. Franklin Foss
Attorney—Davis, Lucas, Brewer & Brugman ABSTRACT: Support for a carrier removably receiving a front basket universally attachable to any bicycle having a handlebar stem, comprising a pair of side frames each bent from a tube to provide a lower horizontal end portion, a lower reach extending upwardly and rearwardly therefrom and terminating in a downwardly sloping part continuing as an upwardly extending intermediate portion, an upper reach extending upwardly and forwardly from the intermediate portion, and continuing downwardly at its forward end for attachment to the lower horizontal end portion, with the upper and lower reaches converging respectively from the front to the intermediate portions which are spaced from and parallel to each other, and clamping means for engaging the handlebar stem.

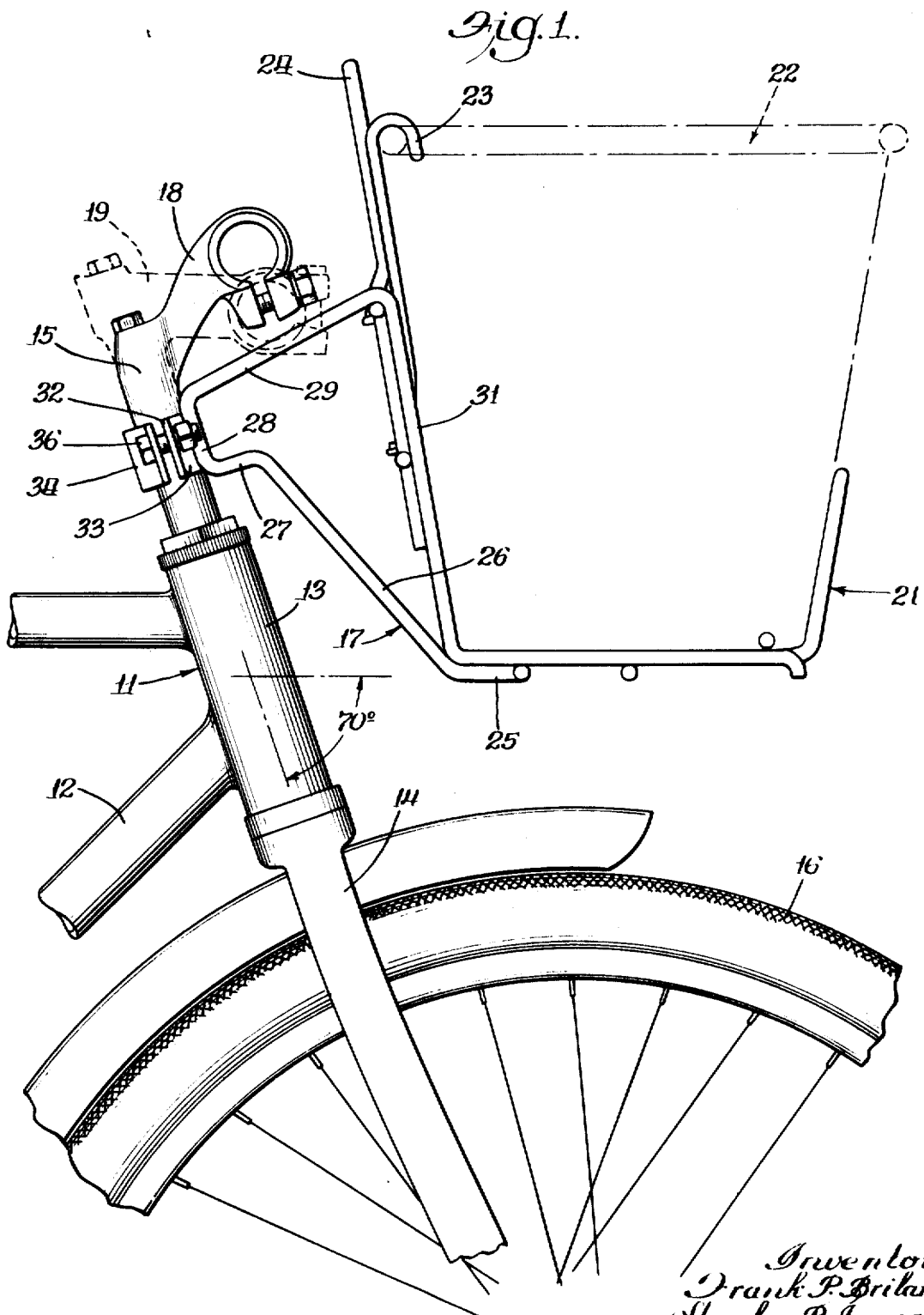

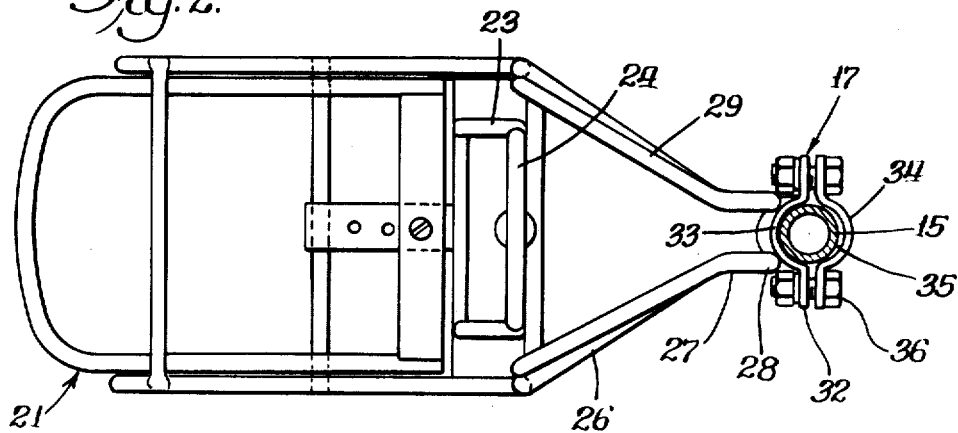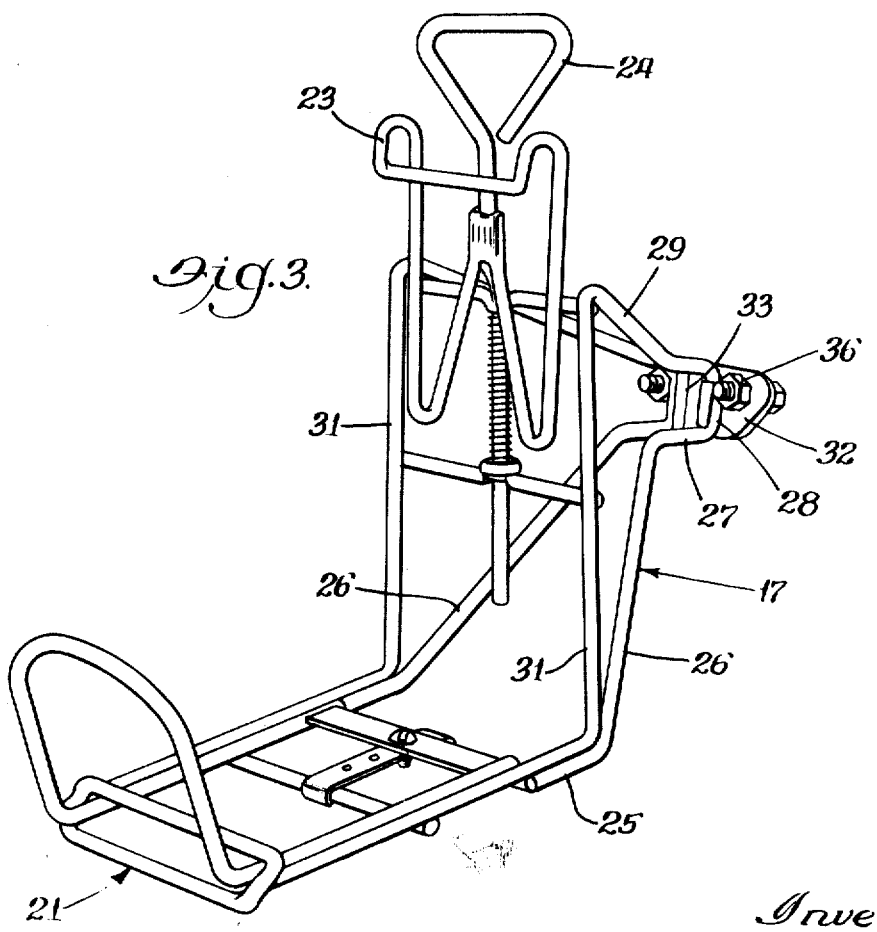

UNIVERSAL SUPPORT FOR FRONT BASKET FOR BICYCLES

BACKGROUND OF THE INVENTION

1. Field of the Invention

This invention relates generally to article-carrying baskets for bicycles, and more particularly to a novel support for a carrier removably receiving a front basket which is universally attachable to any bicycle having a handlebar stem.

2. Description of the Prior Art

Front baskets for bicycles and carriers for removably receiving the same heretofore have been supported on the handlebar or by struts extending down to the front axle, or both, but such require different supports for different styles of handlebars and struts of different lengths for use with different sizes of front wheels.

SUMMARY OF THE INVENTION

This invention provides a universal support for mounting a front basket on any bicycle having a handlebar stem which fits all known stems and may be used on bicycles employing any size of front wheel and any style of handlebar. The illustrated embodiment comprises a pair of side frame members each of which terminates in a horizontal end portion with a lower reach extending upwardly and rearwardly therefrom and joined by an intermediate portion to an upper reach extending upwardly and forwardly, with the upper and lower reaches converging toward each other from front to rear, the upper reaches preferably continuing downwardly at their forward ends for attachment to the associated horizontal end portions, and clamping means secured to the intermediate portions for mounting the support on any handlebar stem. In this embodiment, the upper end of each lower reach preferably extends rearwardly and slightly downwardly in joining its intermediate portion, the latter are parallel and spaced from each other, the clamping means includes a front plate secure to the intermediate portions and having a substantially semicylindrical portion for engaging the handlebar stem, and the side frame members form part of a carrier for removably receiving a basket.

In the drawings:

FIG. 1 is a side elevation of part of the front end of a bicycle showing an embodiment of this invention mounted on the handlebar stem;

FIG. 2 is a top plan view of the universal support and carrier of FIG. 1, with the handlebar stem shown in section; and FIG. 3 is a perspective view of the universal support and carrier separate from the bicycle.

DESCRIPTION OF THE PREFERRED EMBODIMENT

Referring particularly to FIG. 1, reference numeral 11 indicates in general a bicycle which includes a frame 12 having a head tube 13 for rotatably supporting the tubular post of a front fork 14 and a handlebar stem 15 mounted therein and extending upwardly therefrom in well-known manner, the lower end of the fork 14 (not shown) receiving the usual axle for the front wheel 16. Since the instant invention comprises a universal support, indicated generally by reference numeral 17, which is adapted for use with all known handlebar stems, one type of stem 15 having an upwardly and forwardly extending handlebar-engaging portion 18 is illustrated in FIG. 1 in full lines and another type having a downwardly and forwardly extending handlebar-engaging portion 19 is included therein broken lines to show how the support 17 accommodates the same. Similarly, the support 17 may be used with different types or styles of handlebars, but illustration of the latter is omitted for the sake of clarity.

As illustrated herein, the support 17 forms a part of a carrier 21 for removably receiving a front basket 22 shown mounted thereon in broken lines in FIG. 1, the carrier including a clamping hook portion 23 spring-urged downwardly into edge-engagement with the basket 22 mounted thereon and a handle portion 24 for manually lifting the clamping hook 23 against the action of its spring to disengage the same from the basket 22 to permit ready removal of the latter from the carrier 21. It will be understood, of course, that the support 17 may be employed equally as well as a part of a basket and without using a basket-receiving carrier if it is desired not to provide an instantly removable basket.

The support 17 includes a pair of side frame members (FIGS. 2 and 3) each of which comprises a lower horizontal end portion 25 (FIGS. 1 and 3), a lower reach 26 extending upwardly and rearwardly therefrom with its upper end continuing rearwardly as a slightly downwardly extending part 27, an intermediate portion 28, and an upper reach 29 extending upwardly and forwardly from the intermediate portion and terminating in a downwardly extending forward end portion 31 attached in any suitable manner, as by welding, to the lower horizontal end 25. Each of these side frames preferably is formed as a unitary member by bending a suitable length of chromium-plated steel tubing to the indicated shape, with the upper and lower reaches 29 and 26 respectively converging from front to rear and their rear ends, including the downwardly extending parts 27, and the intermediate portions 28 being spaced from and parallel to each other, as best seen in FIG. 2.

Secured to the intermediate portions 28, as by welding, is a front plate 32 formed intermediate its ends with a substantially semicylindrical portion 33 for engaging the forward surface of the handlebar stem 15. A separate rear plate 34 shaped complementally to the front plate 32 and having resilient means thereon in the form of a pad or pads 35 (FIG. 2) for engaging the rearward surface of the stem 15 is interconnected with the front plate 32 adjacent the ends of the plates by nut and bolt means 36, preferably including suitable lockwashers. The members 32–36 constitute clamping means adapted to secure the support 17 on the handlebar stem 15 as the only means of attachment to the bicycle for supporting the basket. Since the axis of the head tube 13 and handlebar stem 15 in any bicycle normally is slanted rearwardly to define an acute angle of approximately 70° with the horizontal, the axes of the intermediate portions 28 and the main plane of the front plate 32 are similarly disposed to define an acute angle of approximately 70° with the axes of the lower end portions 25 of the support frame members, as indicated in FIG. 1.

The diverging disposition from rear to front of the upper reaches 29 best seen in FIG. 2 accommodates any stem having a handlebar-engaging portion which extends downwardly as shown at 19 in broken lines in FIG. 1, and the similar relative disposition of the lower reaches 26 provides clearance for any size of front wheel.

We claim:

1. A universal support for mounting a front basket on any bicycle having a handlebar stem, comprising a pair of side frame members each terminating in a horizontal end portion and having a lower reach extending upwardly and rearwardly therefrom joined by an intermediate portion to an upper reach extending upwardly and forwardly from the intermediate portion, with said upper and lower reaches of said frame members respectively converging from front to rear, and clamping means secured to said intermediate portions for mounting the support on a bicycle handlebar stem as the only means of attachment to the bicycle for supporting a basket forwardly of the handlebar, wherein said clamping means comprises a front plate secured to said intermediate portions and formed intermediate its ends with a substantially semicylindrical portion for engaging the forward surface of said stem, a rear plate shaped complementally to said front plate and having resilient means thereon for engaging the rearward surface of said stem, and bolt means for interconnecting the ends of said front and rear plates.

2. A universal support according to claim 1, wherein said intermediate portions of said side frame members are parallel to each other and are welded to said front plate.

3. A universal support according to claim 1, wherein said side members form part of a carrier for removably receiving a basket, and a clamping hook portion supported by said side frame members and spring-urged downwardly into edge-engagement with said basket.